United States Patent [19]

Shiba et al.

[11] Patent Number: 5,714,195
[45] Date of Patent: Feb. 3, 1998

[54] COLOR FILTER REPAIR METHOD AND APPARATUS, COLOR FILTER, LIQUID CRYSTAL DISPLAY DEVICE, AND APPARATUS HAVING LIQUID CRYSTAL DISPLAY DEVICE

[75] Inventors: Shoji Shiba, Sagamihara; Hiroshi Sato, Yokohama; Katsuhiro Shirota, Inagi; Hideto Yokoi, Yokohama; Takeshi Miyazaki, Ebina; Akio Kashiwazaki, Yokohama, all of Japan

[73] Assignee: Canon Kabushiki Kaisha, Tokyo, Japan

[21] Appl. No.: 412,576

[22] Filed: Mar. 29, 1995

[30] Foreign Application Priority Data

Mar. 31, 1994 [JP] Japan .................. 6-063410
Mar. 16, 1995 [JP] Japan .................. 7-057225

[51] Int. Cl.$^6$ .................................................. B05D 5/06
[52] U.S. Cl. .................. 427/140; 427/162; 427/256; 427/287
[58] Field of Search .................. 427/140, 162, 427/287, 256

[56] References Cited

U.S. PATENT DOCUMENTS

| | | | |
|---|---|---|---|
| 4,313,124 | 1/1982 | Hara | 346/140 |
| 4,345,262 | 8/1982 | Shirato et al. | 346/140 |
| 4,459,600 | 7/1984 | Sato et al. | 346/140 |
| 4,463,359 | 7/1984 | Ayata et al. | 346/1.1 |
| 4,558,333 | 12/1985 | Sugitani et al. | 346/140 |
| 4,608,577 | 8/1986 | Hori | 346/140 |
| 4,723,129 | 2/1988 | Endo et al. | 346/1.1 |
| 4,740,796 | 4/1988 | Endo et al. | 346/1.1 |
| 4,991,030 | 2/1991 | Sato et al. | 358/474 |
| 5,032,713 | 7/1991 | Eguchi et al. | 250/211 |
| 5,246,804 | 9/1993 | Furukawa et al. | 430/20 |
| 5,281,450 | 1/1994 | Yaniv | 427/510 |
| 5,340,619 | 8/1994 | Chen et al. | 424/498 |

FOREIGN PATENT DOCUMENTS

| | | |
|---|---|---|
| 0452027 | 10/1991 | European Pat. Off. . |
| 54-56847 | 5/1979 | Japan . |
| 59-123670 | 7/1984 | Japan . |
| 59-138461 | 8/1984 | Japan . |
| 60-71260 | 4/1985 | Japan . |
| 3274504 | 12/1991 | Japan . |
| 5-27111 | 2/1993 | Japan . |
| 5-72528 | 3/1993 | Japan . |
| 5288917 | 11/1993 | Japan . |
| 5288918 | 11/1993 | Japan . |
| 5303014 | 11/1993 | Japan . |
| 6-347636 | 12/1994 | Japan . |
| WO 93/24240 | 12/1993 | WIPO . |
| WO 9521400 | 8/1995 | WIPO . |

OTHER PUBLICATIONS

Patent Abstracts of Japan, vol. 17, No. 302 (P-1553), 10 Jun. 1993 & JP-A-05 027 111 (Sharp) 5 Feb. 1993 *abstract; figure*.

Patent Abstracts of Japan, vol. 17, No. 399 (P-1579), 26 Jul. 1993 & JP-A-05 072 528 (Dainippon Printing) 26 Mar. 1993 *abstract; figures*.

Primary Examiner—Janyce Bell

[57] ABSTRACT

It is an object of the present invention to provide a color filter repair method which can easily repair defects of a color filter. In order to achieve this object, there is provided a color filter repair method of repairing a defective portion such as a color omission or color irregularity of a filter element of a color filter formed by arranging filter elements colored in predetermined colors on a transparent substrate in the form of a predetermined pattern, wherein the defective portion is repaired by discharging a coloring material of a predetermined color onto the defective portion using an ink-jet head capable of discharging coloring materials of different colors.

4 Claims, 16 Drawing Sheets

14a COLOR OMISSION CAUSED BY SHORTAGE OF INK

14b COLOR IRREGULARITY (PALE) CAUSED BY SHORTAGE OF INK

COLOR FILTER REPAIR METHOD AND APPARATUS, COLOR FILTER, LIQUID CRYSTAL DISPLAY DEVICE, AND APPARATUS HAVING LIQUID CRYSTAL DISPLAY DEVICE

BACKGROUND OF THE INVENTION

1. Field of the Invention

The present invention relates to a repair method and apparatus for repairing defective portions of a color filter formed by arranging filter elements colored in different colors on a transparent substrate, the color filter, a liquid crystal display apparats, and an apparatus having the liquid crystal display device.

2. Description of the Related Art

With recent advances in personal computers, especially portable personal computers, the demand tends to arise for liquid crystal displays, especially color liquid crystal displays. A color liquid crystal display uses a color filter having filter elements colored in, e.g., R (red), G (green), and B (blue) and arranged in a matrix form. Various methods have been proposed as methods of manufacturing such color filters. The respective methods will be described below. The first method is a dyeing method, which is the most popular method. In the dyeing method, a water-soluble polymer material used for dyeing is coated on a glass substrate, and the coating is patterned into a desired shape by a photolithography process. The obtained pattern is dipped in a dye bath to obtain a colored pattern. This process is repeated three times to form R, G, and B color filter layers.

The second method is a pigment dispersion method, which is currently replacing the dyeing method. In this method, a pigment-dispersed photosensitive resin layer is formed on a substrate and patterned into a single-color pattern. This process is repeated three times to obtain R, G, and B color filter layers.

The third method is an electrodeposition method. In this method, a transparent electrode is patterned on a substrate, and the resultant structure is dipped in an electrodeposition coating fluid containing a pigment, a resin, an electrolyte, and the like to be colored in the first color by electrodeposition. This process is repeated three times to form R, G, and B color filter layers. Finally, these layers are calcined.

The fourth method is a method of dispersing a pigment in a thermosetting resin, performing a print operation three times to form R, G, and B coatings separately, and thermosetting the resins, thereby forming colored layers. In either of the above methods, a protective layer is generally formed on colored layers.

Color filters can be manufactured by the above methods. With any of the above methods, however, it is very difficult to manufacture a product without any defect on the entire surface of a color filter having filter elements. For this reason, the yield of color filters is poor, resulting in an increase in the cost of a color liquid crystal display.

In order to prevent such an increase in cost, the yield of color filters may be improved by repairing a color filter having some defects.

In the above conventional method, even if one of the filter elements of a color filter has a defect, a repair process must be performed with respect to the entire surface of the filter. That is, the efficiency of the repair process is very poor. If different color filter elements have defects, the same repair process must be repeated the number of times corresponding to the number of the different colors. This makes the overall repair process more cumbersome.

Defects in filter elements include foreign substances mixed in filter elements, color omissions caused by pinholes, and the like. Of these defects, defects caused by pinholes and the like can be repaired by the above method. However, if foreign substances are mixed in filter elements, the foreign substances must be removed first, and coloring must then be performed with respect to the portions from which the foreign substances are removed.

As a method of removing such foreign substances, a method of removing a portion, of a filter element, in which a foreign substance is mixed, and re-coloring the corresponding portion has been provided, as disclosed in Japanese Patent Laid-Open Nos. 5-27111 and 5-72528. In addition, as disclosed in Japanese Patent Laid-Open No. 3-274504, a method of performing a laser process or the like to remove the entire one-pixel portion of a filter element in which a foreign substance is mixed has been proposed. However, in these methods as well, in re-coloring portions from which foreign substances have been removed, coloring is manually performed in units of pixels. Therefore, the repair process requires much labor. Assume that a plurality of pixels having defects are to be colored at once. Even in this case, if filter elements of different colors have defects, the same repair process must be repeated the number of times corresponding to the number of the different colors. That is, the above problem is still left unsolved.

Furthermore, a method of performing a repair process by coloring a plurality of pixels having defects at once is disclosed in Japanese Patent Laid-Open No. 5-303014. In this method as well, if filters of different colors have defects, the same repair process must be repeated the number of times corresponding to the number of the different colors.

SUMMARY OF THE INVENTION

The present invention has been made in consideration of the above situation, and has as its first object to provide a color filter repair method and apparatus which can easily repair defects of a color filter.

It is the second object of the present invention to provide a color filter repaired by the above color filter repair method and apparatus, a liquid crystal display device using the color filter, and an apparatus having the liquid crystal display device.

In order to solve the above problems and achieve the above objects, a color filter repair method of the present invention is characterized by the following process according to its first aspect.

There is provided a color filter repair method of repairing a defective portion such as a color omission or color irregularity of a filter element of a color filter formed by arranging filter elements colored in predetermined colors on a transparent substrate in the form of a predetermined pattern, wherein the defective portion is repaired by discharging a coloring material of a predetermined color onto the defective portion using an ink-jet head capable of discharging coloring materials of different colors.

A color filter repair method of the present invention is characterized by the following process according to its second aspect.

There is provided a color filter repair method of repairing a defective portion such as a foreign substance in a filter element of a color filter formed by arranging filter elements colored in predetermined colors on a transparent substrate in the form of a predetermined pattern, comprising the first step of removing the foreign substance by a laser process, and the second step of repairing the filter element by discharging a coloring material onto a portion, from which the foreign substance has been removed in the first step, using an ink-jet head capable of discharging coloring materials of different colors.

A color filter repair apparatus of the present invention is characterized by the following arrangement according to its first aspect.

There is provided a color filter repair apparatus for repairing a defective portion such as a color omission or color irregularity of a filter element of a color filter formed by arranging filter elements colored in predetermined colors on a transparent substrate in the form of a predetermined pattern, comprising detection means for detecting the defective portion, an ink-jet head for discharging a coloring material onto the defective portion, holding means for holding the color filter while causing the color filter to oppose the detection means and the ink-jet head, moving means for moving positions of the detection means and the ink-jet head relative to a position of the holding means, and control means for causing the moving means to move a defective portion detected by the detection means to a position corresponding to the ink-jet head, and performing control to cause the ink-jet head to discharge a coloring material onto the defective portion.

A color filter repair apparatus of the present invention is characterized by the following arrangement according to its second aspect.

There is provided a color filter repair apparatus for repairing a defective portion such as a color omission or color irregularity of a filter element of a color filter formed by arranging filter elements colored in predetermined colors on a transparent substrate in the form of a predetermined pattern, comprising an ink-jet head for discharging a coloring material onto the defective portion, holding means for holding the color filter while causing the color filter to oppose the ink-jet head, moving means for moving relative positions of the ink-jet head and the holding means, and control means for causing the moving means to move a detected defective portion to a position corresponding to the ink-jet head, and performing control to cause the ink-jet head to discharge a coloring material onto the defective portion.

A color filter of the present invention is characterized in the following arrangement according to its first aspect.

There is provided a color filter formed by arranging a plurality of filter elements colored in predetermined colors on a transparent substrate in the form of a predetermined pattern, wherein a defective portion such as a color omission or color irregularity of the filter element is repaired by discharging a coloring material of a predetermined color onto the defective portion using an ink-jet head capable of discharging coloring materials of different colors.

A color filter of the present invention is characterized by the following arrangement according to its second aspect.

There is provided a color filter formed by arranging a plurality of filter elements colored in predetermined colors on a transparent substrate in the form of a predetermined pattern, wherein a defective portion such as a foreign substance in the filter element is removed by a laser process, and the defective portion is repaired by discharging a coloring material onto a portion, from which the defective portion has been removed, using an ink-jet head capable of discharging coloring materials of different colors.

A liquid crystal display device of the present invention is characterized by the following arrangement according to its first aspect.

There is provided a liquid crystal display device using a color filter formed by arranging a plurality of filter elements colored in predetermined colors on a transparent substrate in the form of a predetermined pattern, comprising a color filter obtained by repairing a defective portion such as a color omission or color irregularity of the filter element by discharging a coloring material of a predetermined color onto the defective portion using an ink-jet head capable of discharging coloring materials of different colors, and a substrate opposing the color filter, wherein a liquid crystal compound is sealed between the two substrates.

A liquid crystal display device of the present invention is characterized by the following arrangement according to its second aspect.

There is provided a liquid crystal display device using a color filter formed by arranging a plurality of filter elements colored in predetermined colors on a transparent substrate in the form of a predetermined pattern, comprising a color filter obtained by removing a defective portion such as a foreign substance in the filter element by a laser process, and repairing the defective portion by discharging a coloring material onto a portion, from which the defective portion has been removed, using an ink-jet head capable of discharging coloring materials of different colors, and a substrate opposing the color filter, wherein a liquid crystal compound is sealed between the two substrates.

An apparatus having a liquid crystal display device of the present invention is characterized by the following arrangement according to its first aspect.

There is provided an apparatus comprising the liquid crystal display device defined in claim 17, and image signal output means for outputting an image signal to the liquid crystal display device.

An apparatus having a liquid crystal display device of the present invention is characterized by the following arrangement according to its second aspect.

There is provided an apparatus comprising the liquid crystal display device defined in claim 18, and image signal output means for outputting an image signal to the liquid crystal display device.

Other objects and advantages besides those discussed above shall be apparent to those skilled in the art from the description of a preferred embodiment of the invention which follows. In the description, reference is made to accompanying drawings, which form a part thereof, and which illustrates an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 9A and 9B are sectional views showing a method of repairing a defective portion as a color omission caused by a pinhole in a filter element formed by the dyeing method, the pigment dispersion method, or the like;

DETAILED DESCRIPTION OF THE PREFERRED EMBODIMENTS

A preferred embodiment of the present invention will be described in detail below with reference to the accompanying drawings.

Figure 1A:
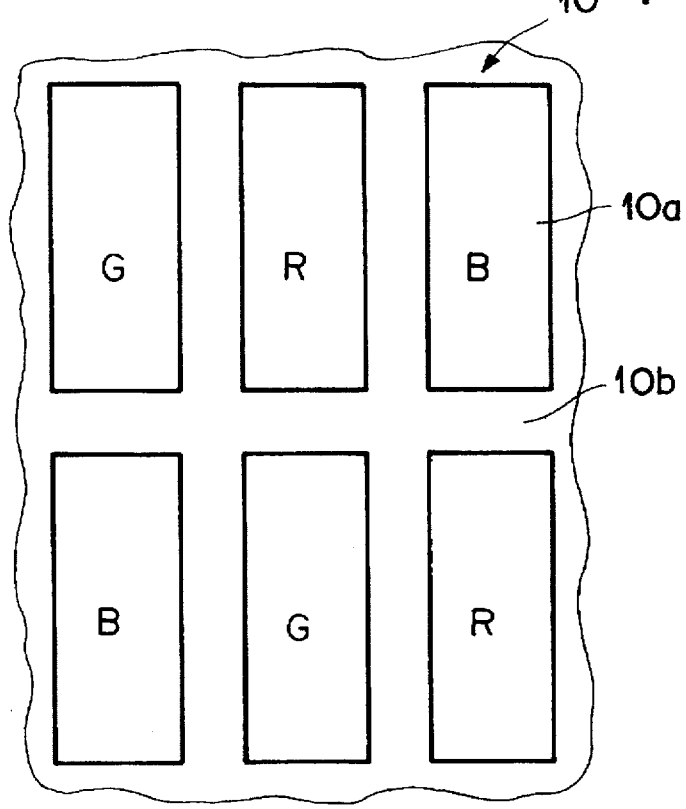
FIGS. 1A and 1B are partial enlarged views showing color filters repaired by a color filter repair method and apparatus according to the present invention.
Figure 1B:
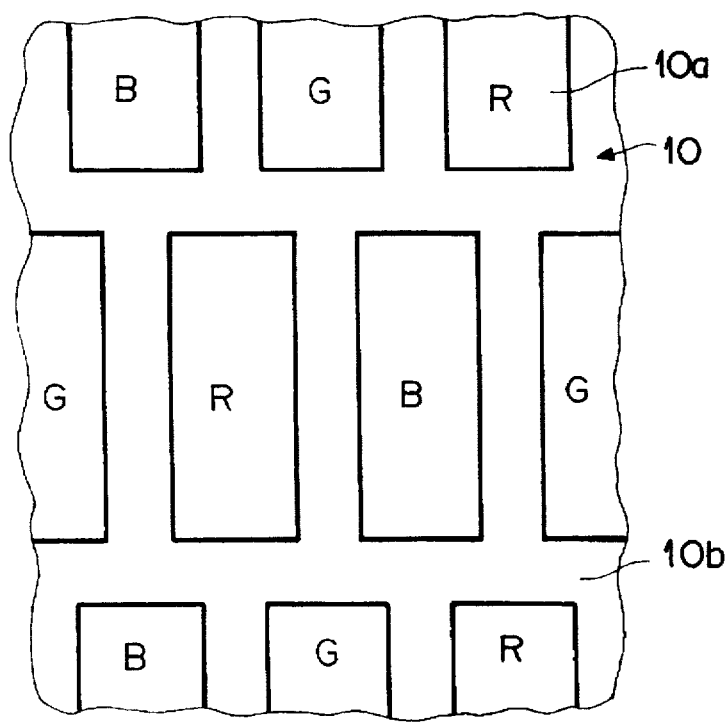

FIGS. 1A and 1B are partial enlarged views showing color filters to which a color filter repair method of the present invention is applied.

Each color filter 10 is mounted on the front surface of a color liquid crystal display or the like used for a portable personal computer or the like. As shown in FIG. 1A, filter elements 10a colored in R (red), G (green), and B (blue) are two-dimensionally arranged in a matrix form. In the color filter shown in FIG. 1A, the filter elements 10a are arranged in a simple matrix form. In the color filter shown in FIG. 1B, the filter elements 10a are arranged in a staggered form. A black light-shielding grating 10b is formed between the respective filter elements 10a to make the boundaries between the filter elements 10a clear so as to provide a clear screen.

Figure 2A:
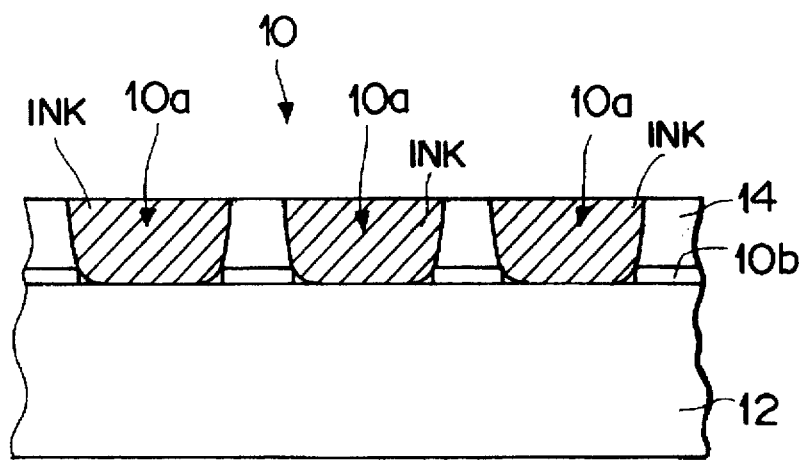
FIGS. 2A and 2B are side sectional views showing the color filter in FIG. 1A or 1B.

FIG. 2A is a side sectional view of the color filter 10 in FIG. 1A or 1B. The light-shielding grating 10b is formed on a glass substrate 12 constituting the main body of the color filter 10. The filter elements 10a of the respective colors are formed on the light-shielding grating 10b.

In manufacturing the color filter 10, chromium is deposited on the glass substrate 12 by sputtering, and the resultant film is formed into a matrix pattern by photolithography. This pattern is the light-shielding grating 10b. A layer 14 to be dyed is formed on the light-shielding grating 10b. The layer 14 consists of a cellulose, an acrylic resin, gelatin, or the like and absorbs a fluid. Droplets (to be referred to as an ink hereinafter) containing a coloring material (dye) are sprayed on the filter element formation regions of the layer 14 by a recording head of the ink-jet system. With this process, the layer 14 is colored to form the color filter elements 10a.

Figure 2B:
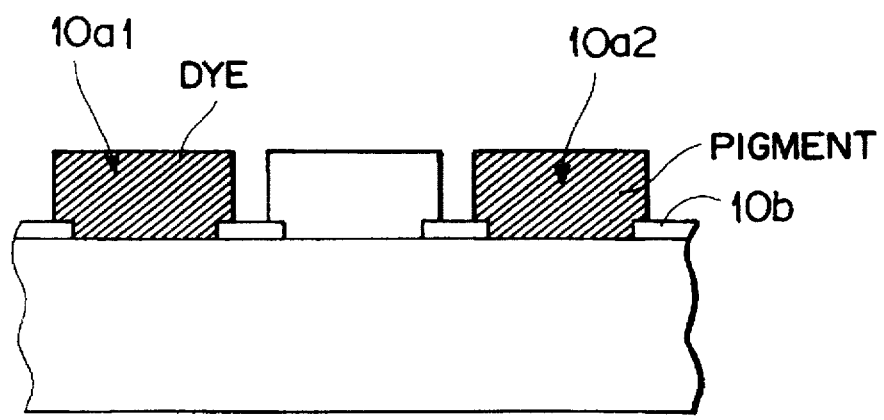

FIG. 2B is a side sectional view of the color filter 10 manufactured by the dyeing method or the pigment dispersion method described in "Description of the Related Art". In practice, filter elements manufactured by the dyeing method and the pigment dispersion method are not formed on the same substrate. However, for the sake of descriptive convenience, in the case shown in FIG. 2B, these filter elements are formed on the same substrate.

Referring to FIG. 2B, an element 10a1 is formed by the dyeing method. That is, this filter element is obtained by dyeing a water-soluble polymer material. An element 10a2 is formed by the pigment dispersion method. That is, this filter element is obtained by dispersing a pigment in a photosensitive resin.

Note that a protective layer is formed on filter elements, as needed. As the protective layer, for example, a layer consisting of a resin material of a photo-setting, thermosetting, or photo-setting/thermosetting type, or an inorganic film formed by vapor deposition, sputtering, or the like can be used. Such a layer can be used as long as it exhibits transparency upon formation of a color filter and can withstand the subsequent processes, e.g., an ITO (Indium Tin Oxide) formation process and an aligning film formation process.

Figure 12:
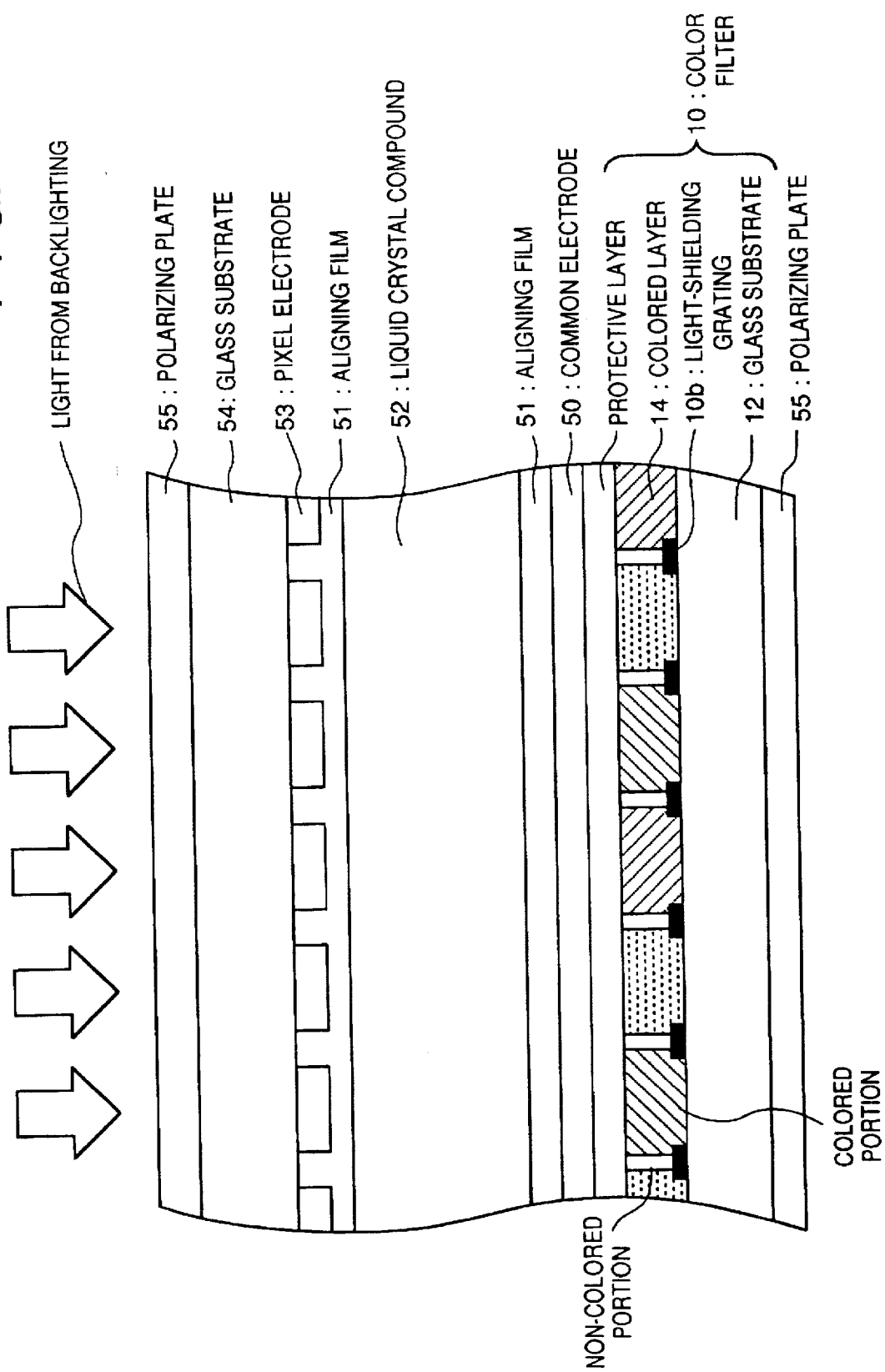
FIG. 12 is a side sectional view showing the structure of a color liquid crystal panel.
Figure 13:
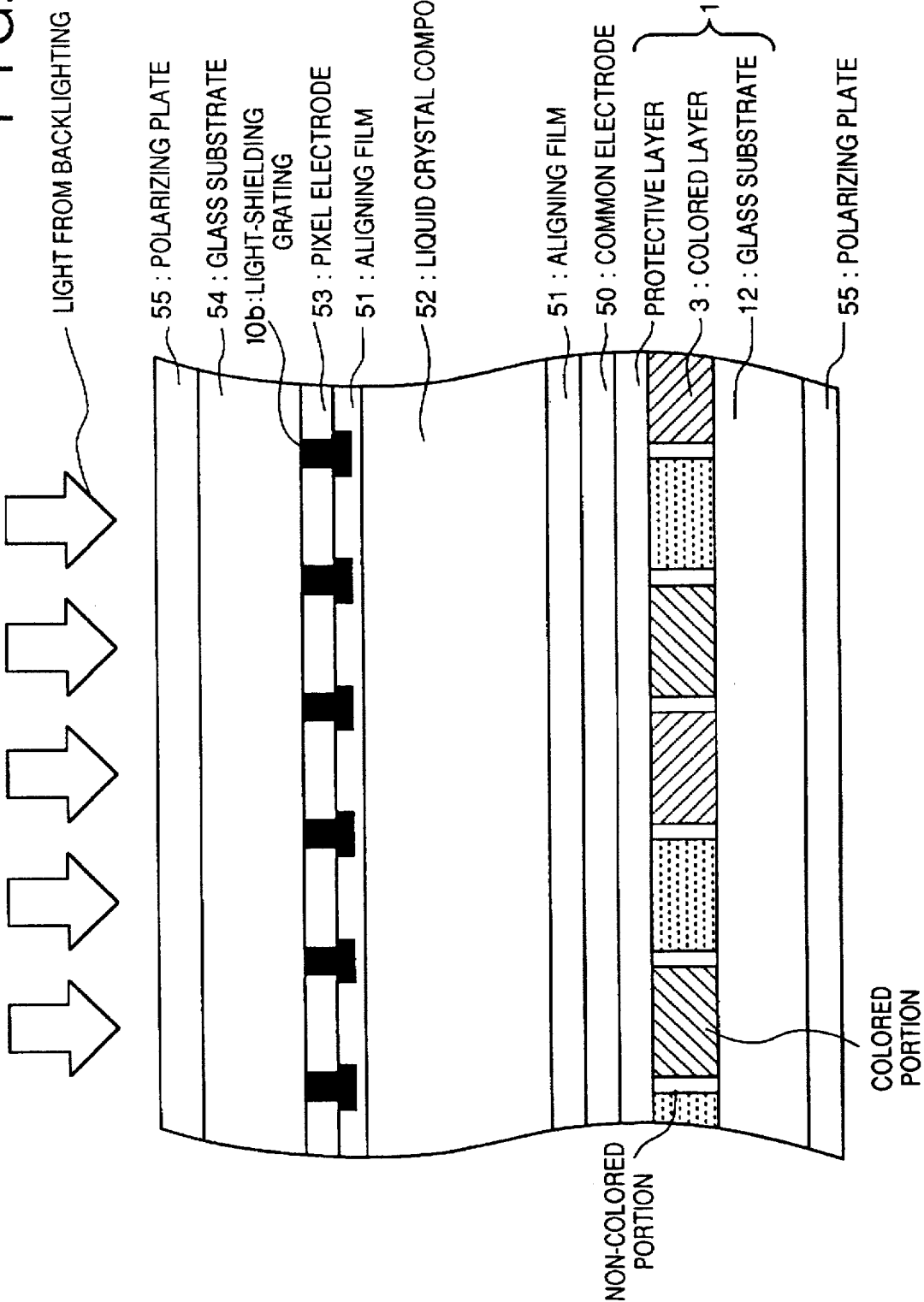
FIG. 13 is a side sectional view showing the structure of a color liquid crystal panel.

In general, a color liquid crystal panel is formed by joining the color filter substrate 12 to a counter substrate 54 and sealing a liquid crystal compound 52 therebetween. TFTs (Thin Film Transistor) (not shown) and transparent pixel electrodes 53 are formed on the inner surface of one substrate 54 of the liquid crystal panel in a matrix form. The color filter 10 is placed on the inner surface of the other substrate 12 such that the R, G, and B coloring materials are positioned to oppose the pixel electrodes. A transparent counter electrode (common electrode) 50 is formed on the entire surface of the color filter 10. The light-shielding grating 10b is generally formed on the color filter substrate 12 side (see FIG. 12). However, in a BM (Black Matrix) on-array type liquid crystal panel, such a grating is formed on the TFT substrate side opposing the color filter substrate (see FIG. 13). Aligning films 51 are formed within the planes of the two substrates. By performing a rubbing process for the aligning films 51, the liquid crystal molecules can be aligned in a predetermined direction. Polarizing plates 55 are bonded to the outer surfaces of the respective glass substrates. The liquid crystal compound 52 is filled in the gap (about 2 to 5 μm) between these glass substrates. As a blacklight, a combination of a fluorescent lamp (not shown) and a scattering plate (not shown) is generally used. A display operation is performed by causing the liquid crystal compound to serve as an optical shutter for changing the transmittance for light emitted from the backlight.

A case wherein the above liquid crystal panel is applied to an information processing unit will be described below with reference to FIGS. 14 to 16.

Figure 14:
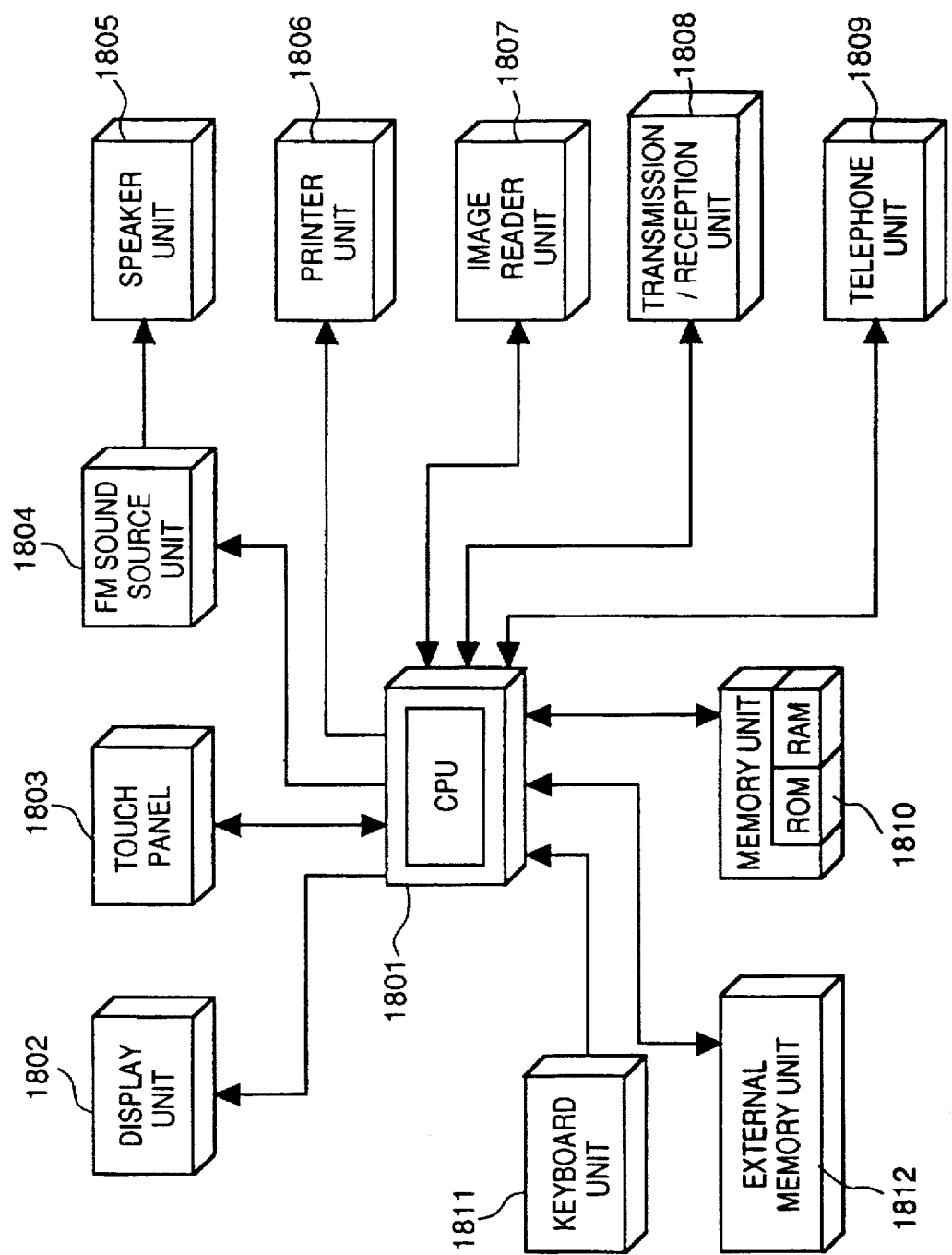
FIG. 14 is a block diagram showing an information processing unit using a liquid crystal panel.

FIG. 14 is a block diagram showing the schematic arrangement of an information processing unit serving as a wordprocessor, a personal computer, a facsimile apparatus, and a copying machine, to which the above liquid crystal panel is applied.

Referring to FIG. 14, reference numeral 1801 denotes a control unit for controlling the overall apparatus. The control unit 1801 includes a CPU such as a microprocessor and various I/O ports, and performs control by outputting/inputting control signals, data signals, and the like to/from the respective units. Reference numeral 1802 denotes a display unit for displaying various menus, document information, and image data read by an image reader 1807, and the like on the display screen; 1803, a transparent, pressure-sensitive touch panel mounted on the display unit 1802. By pressing the surface of the touch panel 1803 with a finger of the user or the like, an item input operation, a coordinate position input operation, or the like can be performed on the display unit 1802.

Reference numeral 1804 denotes an FM (Frequency Modulation) sound source unit for storing music information, created by a music editor or the like, in a memory unit 1810 or an external memory unit 1812 as digital data, and reading out the information from such a memory, thereby performing FM modulation of the information. An electrical signal from the FM sound source unit 1804 is converted into an audible sound by a speaker unit 1805. A printer unit 1806 is used as an output terminal for the wordprocessor, the personal computer, the facsimile apparatus, and the copying machine.

Reference numeral 1807 denotes an image reader unit for photoelectrically reading original data. The image reader unit 1807 is arranged midway along the original convey passage and designed to read originals for facsimile and copy operations and other various originals.

Reference numeral 1808 denotes a transmission/reception unit for the facsimile (FAX) apparatus. The transmission/reception unit 1808 transmits original data read by the image reader unit 1807 by facsimile, and receives and decodes a sent facsimile signal. The transmission/reception unit 1808 has an interface function for external units. Reference numeral 1809 denotes a telephone unit having a general telephone function and various telephone functions such as an answering function.

Reference numeral 1810 denotes a memory unit including a ROM for storing system programs, manager programs, application programs, fonts, and dictionaries, a RAM for storing an application program loaded from the external memory unit 1812 and document information, a video RAM, and the like.

Reference numeral 1811 denotes a keyboard unit for inputting document information and various commands.

Reference numeral 1812 denotes an external memory unit using a floppy disk, a hard disk, and the like. The external memory unit 1812 serves to store document information, music and speech information, application programs of the user, and the like.

Figure 15:
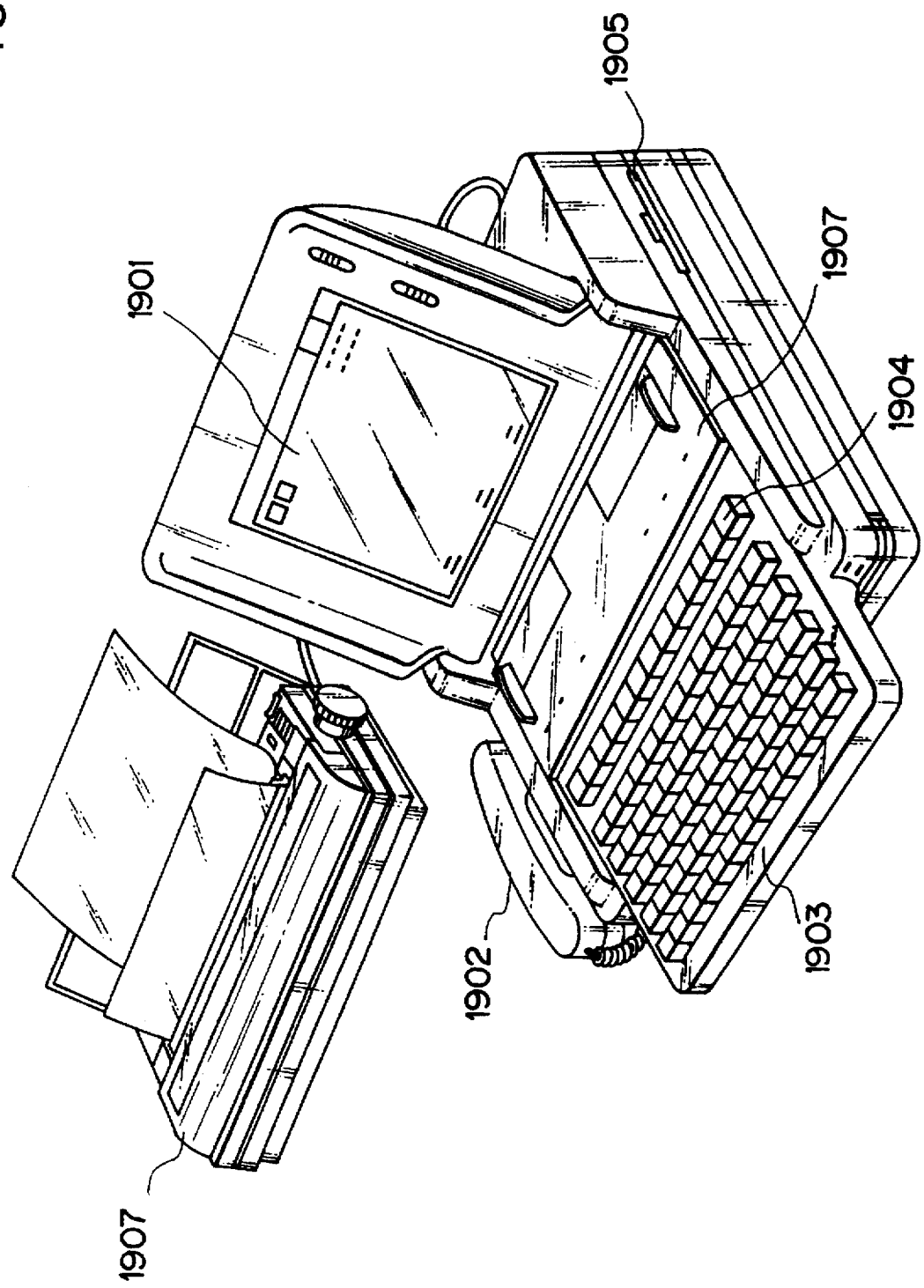
FIG. 15 is a perspective view showing an information processing unit using a liquid crystal panel.

FIG. 15 is a perspective view of the information processing unit in FIG. 14.

Referring to FIG. 15, reference numeral 1901 denotes a flat panel display using the above liquid crystal panel, which displays various menus, graphic pattern information, document information, and the like. A coordinate input or item designation input operation can be performed on the flat panel display 1901 by pressing the surface of the touch panel 1803 with a finger of the user or the like. Reference numeral 1902 denotes a handset used when the apparatus is used as a telephone set. A keyboard 1903 is detachably connected to the main body via a cord and is used to perform various document functions and input various data. This keyboard 1903 has various function keys 1904. Reference numeral 1905 denotes an insertion port through which a floppy disk is inserted into the external memory unit 1812.

Reference numeral 1906 denotes an original table on which an original to be read by the image reader unit 1807 is placed. The read original is discharged from the rear portion of the apparatus. In a facsimile receiving operation, received data is printed out by an ink-jet printer 1907.

When the above information processing unit is to serve as a personal computer or a wordprocessor, various kinds of information input through the keyboard unit 1811 are processed by the control unit 1801 in accordance with a predetermined program, and the resultant information is output, as an image, to the printer unit 1806.

When the information processing unit is to serve as the receiver of the facsimile apparatus, facsimile information input through the transmission/reception unit 1808 via a communication line is subjected to reception processing in the control unit 1801 in accordance with a predetermined program, and the resultant information is output, as a received image, to the printer unit 1806.

When the information processing unit is to serve as the copying machine, an original is read by the image reader unit 1807, and the read original data is output, as an image to be copied, to the printer unit 1806 via the control unit 1801. Note that when the information processing unit is to serve as the receiver of the facsimile apparatus, original data read by the image reader unit 1807 is subjected to transmission processing in the control unit 1801 in accordance with a predetermined program, and the resultant data is transmitted to a communication line via the transmission/reception unit 1808.

Figure 16:
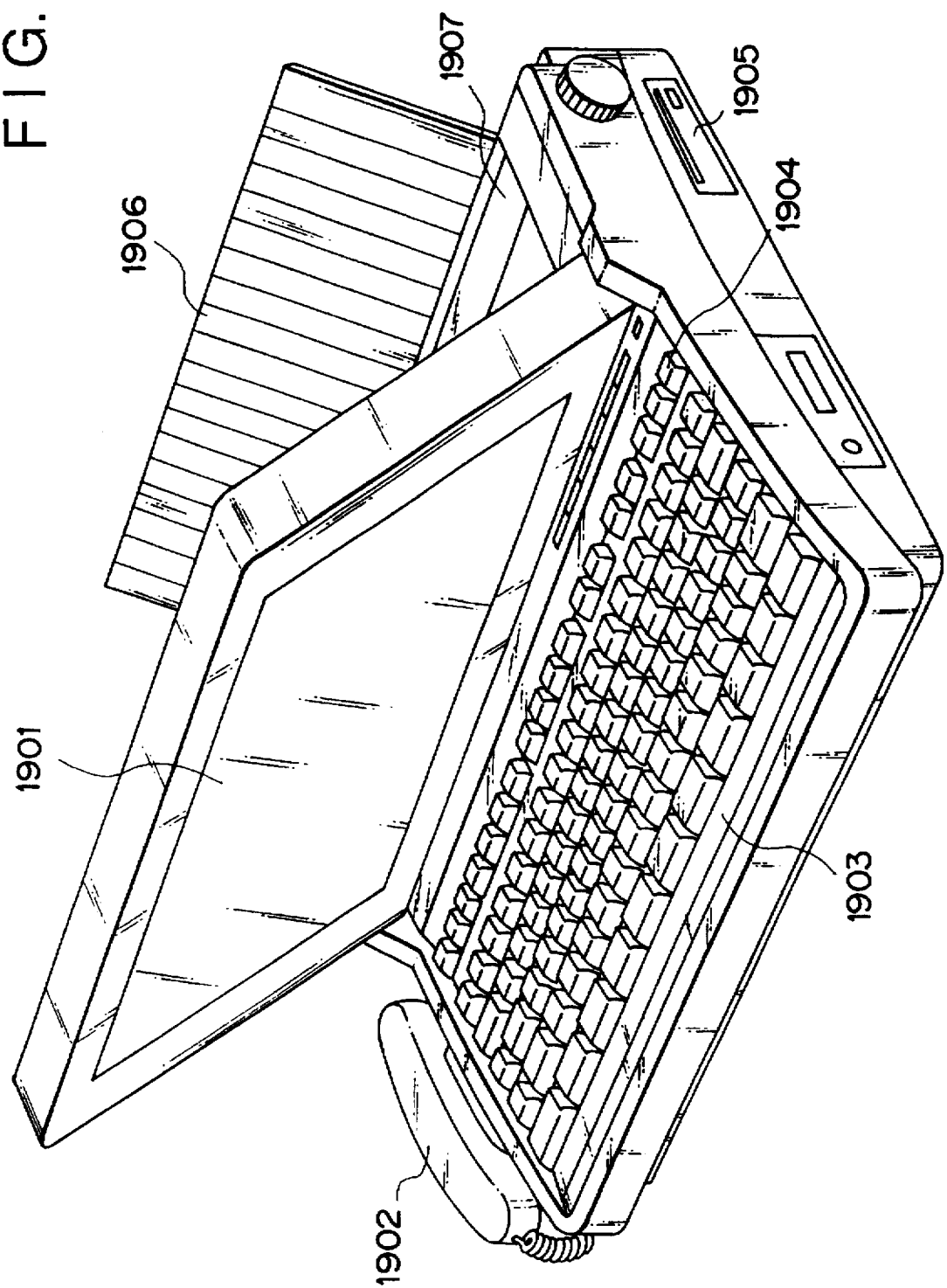
FIG. 16 is a perspective view showing an information processing unit using a liquid crystal panel.

Note that the above information processing unit may be designed as an integrated apparatus incorporating an ink-jet printer in the main body, as shown in FIG. 16. In this case, the portability of the apparatus can be improved. The same reference numerals in FIG. 16 denote parts having the same functions as those in FIG. 15.

Figure 3:
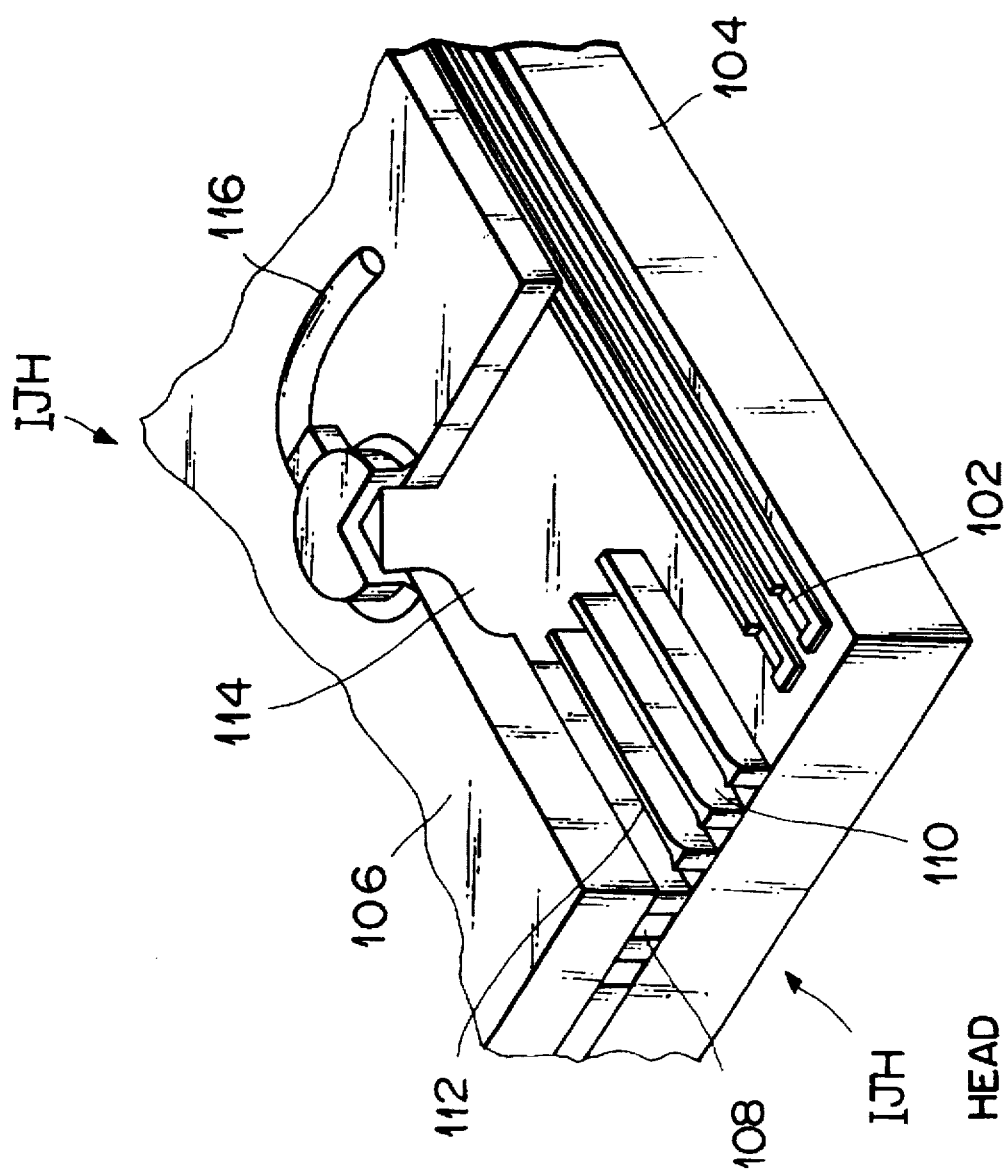
FIG. 3 is a view showing the structure of an ink-jet head IJH for spraying an ink on a layer to be dyed.

FIG. 3 shows the structure of an ink-jet head IJH for spraying ink on the layer 14 in the color filter described above.

Referring to FIG. 3, the ink-jet head IJH mainly comprises a heater board 104 as a board on which a plurality of heaters 102 for heating an ink are formed, and a ceiling plate 106 mounted on the heater board 104. A plurality of discharging openings 108 are formed in the ceiling plate 106. Tunnel-like fluid passages 110 communicating with the discharging openings 108 are formed therebehind. The respective fluid passages 110 are isolated from the adjacent fluid passages via partition walls 112. The respective fluid passages 110 are commonly connected to one ink chamber 114 at the rear side of the fluid passages. An ink is supplied to the ink chamber 114 via an ink inlet 116. This ink is supplied from the ink chamber 114 to each fluid passage 110.

The heater board 104 and the ceiling plate 106 are positioned such that the position of each heater 10 coincides with that of a corresponding fluid passage 110, and are assembled into the state shown in FIG. 3. Although FIG. 3 shows only two heaters 102, the heater 102 is arranged in correspondence with each fluid passage 110. When a predetermined driving signal is supplied to the heater 102 in the assembled state shown in FIG. 3, an ink above the heater 102 is boiled to produce a bubble, and the ink is pushed and discharged from the discharging opening 108 upon volume expansion of the ink. Therefore, the size of a bubble can be adjusted by controlling a driving pulse applied to the heater 102, e.g., controlling the magnitude of power. That is, the volume of the ink discharged from each discharging opening can be arbitrarily controlled.

Figure 4:
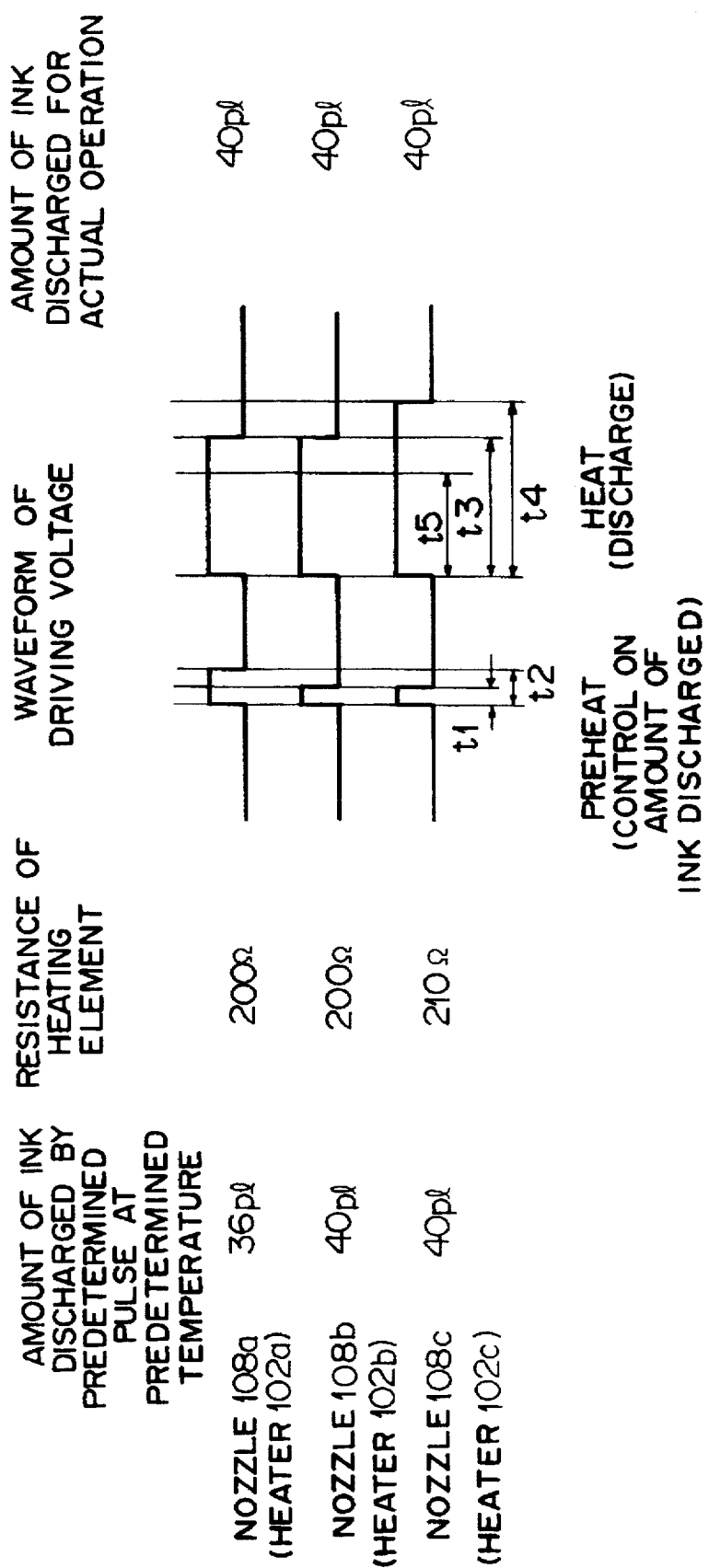
FIG. 4 is a timing chart for explaining a method of controlling the amount of ink discharged by changing power supplied to a heater.

FIG. 4 is a timing chart for explaining a method of controlling the amount of ink discharged by changing power supplied to each heater in this manner.

In this embodiment, two types of constant-voltage pulses are applied to each heater 102 to adjust the amount of ink discharged. The two pulses are a preheat pulse and a main heat pulse (to be simply referred to as a heat pulse hereinafter). The preheat pulse is a pulse for heating an ink to a predetermined temperature before the ink is actually discharged. The pulse width of this pulse is set to be smaller than a minimum pulse width t5 required to discharge the ink. Therefore, the ink is not discharged by this preheat pulse. The preheat pulse is applied to each heater 102 to increase the initial temperature of the ink to a predetermined temperature in advance so as to always make the amount of ink discharged constant when a constant heat pulse is applied to the heater 102 afterward. In contrast to this, the temperature of the ink may be adjusted in advance by adjusting the width of a preheat pulse. In this case, for the same heat pulse, the amount of ink discharged can be changed. In addition, by heating ink before application of a heat pulse, the start time required to discharge the ink upon application of the heat pulse can be shortened to improve the responsibility.

The heat pulse is a pulse for actually discharging the ink. The pulse width of the heat pulse is set to be larger than the minimum pulse width t5 required to discharge the ink. Energy generated by each heater 102 is proportional to the width (application time) of a heat pulse. Therefore, variations in the characteristics of the heaters 102 can be adjusted by adjusting the width of each heat pulse.

Note that the amount of ink discharged can also be adjusted by adjusting the interval between a preheat pulse and a heat pulse to control the dispersed state of heat upon application of the preheat pulse.

As is apparent from the above description, the amount of ink discharged can be controlled both by adjusting the application time of a preheat pulse and by adjusting the interval between application of a preheat pulse and that of a heat pulse. Therefore, by adjusting the application time of a preheat pulse or the interval between application of a preheat pulse and that of a heat pulse as needed, the amount of ink discharged or the responsibility of discharging of the ink with respect to an applied pulse can be arbitrarily adjusted.

Such adjustment of the amount of ink discharged will be described in detail next.

Assume that the ink is discharged in different amounts from discharging openings (nozzles) 108a, 108b, and 108c upon application of the same voltage pulse, as shown in FIG. 4. More specifically, assume that when a voltage having a predetermined pulse width is applied at a predetermined temperature, the amount of ink discharged from the nozzle 108a is 36 pl (pico-liters); the amount of ink discharged from the nozzle 108b, 40 pl; and the amount of ink discharged from the nozzle 108c, 40 pl, and the resistance of heaters 102a and 102b corresponding to the nozzles 108a and 108b is 200 $\Omega$, and the resistance of a heater 102c corresponding nozzle 108c is 210 $\Omega$. Assume that the amounts of ink discharged from the nozzles 108a, 108b, and 108c are to be adjusted to 40 pl.

The widths of a preheat pulse and a heat pulse may be adjusted to adjust the amounts of ink discharged from the nozzles 108a, 108b, and 108c to the same amount. Various combinations of the widths of preheat pulses and heat pulses are conceivable. In this case, the amounts of energy generated by heat pulses are made equal for the three nozzles, and the amounts of ink discharged are adjusted by adjusting the widths of preheat pulses.

Since the heaters 102a and 102b for the nozzles 108a and 108b have the same resistance, i.e., 200 $\Omega$, the amounts of energy generated by heat pulses can be made equal by applying voltage pulses having the same width to the heaters 102a and 102b. In this case, the width of each voltage pulse is set to be t3 which is larger than the width t5. An ink is discharged in different amounts, i.e., 36 pl and 40 pl, from the nozzles 108a and 108b upon application of identical heat pulses. In order to increase the amount of ink discharged from the nozzle 108a, a preheat pulse having a width t2 larger than a width t1 of a preheat pulse applied to the heater 102b is applied to the heater 102a. With this operation, the amounts of ink discharged from the heaters 108a and 108b can be adjusted to 40 pl.

The heater 102c for the nozzle 108c has a resistance of 210 $\Omega$, which is higher than the resistance of the two remaining heaters 102a and 102b. For this reason, in order to cause the heater 102c to generate the same amount of energy as that generated by the two remaining heaters, the width of a heat pulse must be set to be larger than that of the above heat pulse. In this case, therefore, the width of the heat pulse is set to be t4 which is larger than the width t3. Since the amounts of ink discharged from the nozzles 108b and 108c upon application of a predetermined pulse are the same, the width of a preheat pulse required is equal to that of a preheat pulse applied to the heater 102b. That is, a preheat pulse having the width t1 is applied to the heater 102c.

In the above manner, the same amount of ink can be discharged from the nozzles 108a, 108b, and 108c which discharge an ink in different amounts upon application of a predetermined pulse. In addition, the amounts of ink discharged may be intentionally made to differ from each other. Note that preheat pulses are used to reduce variations in the discharging operation of each nozzle.

Figure 5:
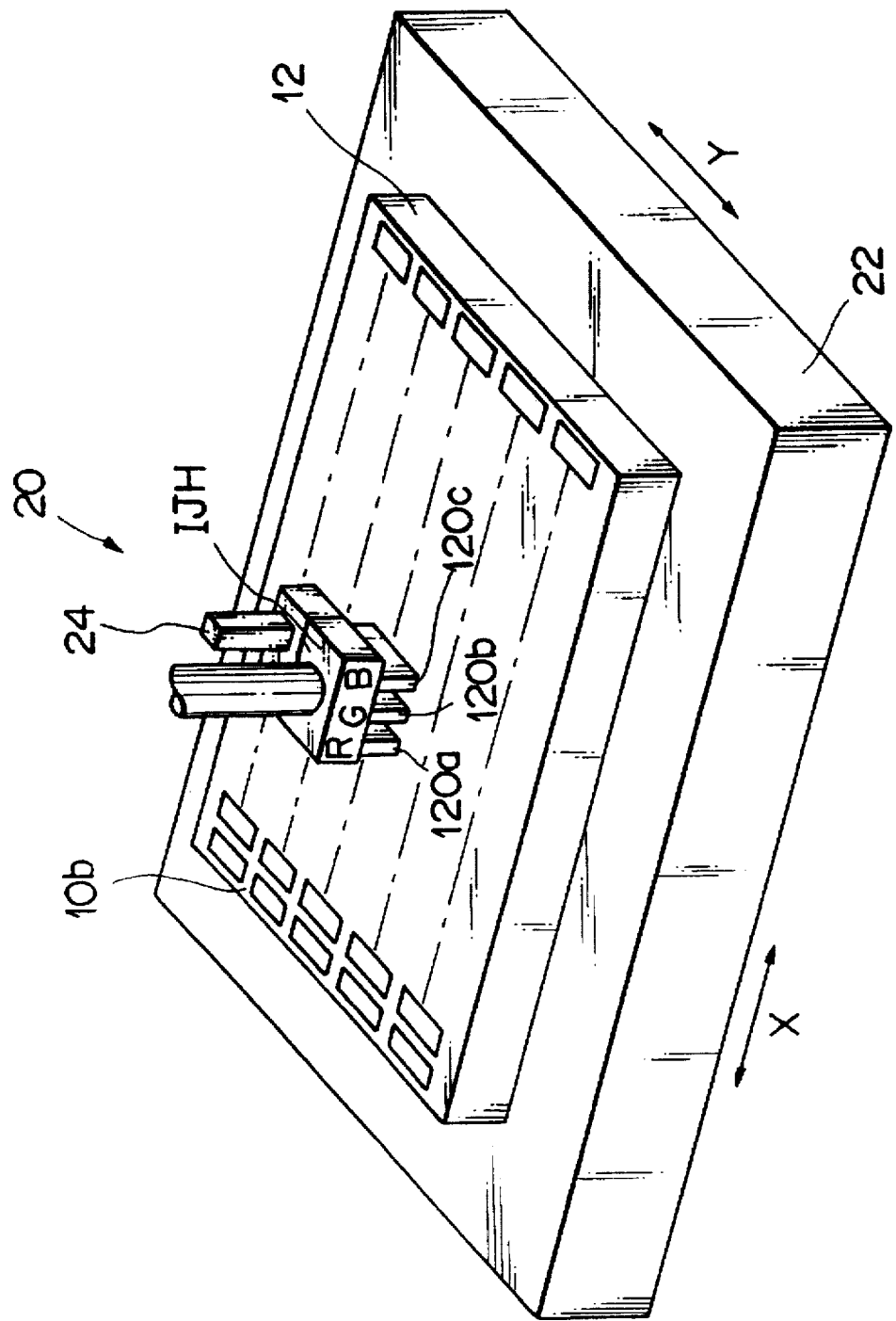
FIG. 5 is a perspective view showing the arrangement of an apparatus for manufacturing the color filter shown in FIGS. 1A or 1B and 2.

FIG. 5 shows the arrangement of an apparatus for manufacturing the color filter shown in FIGS. 1A or 1B and 2.

Referring to FIG. 5, a manufacturing apparatus 20 comprises an X-Y table 22 mounted on a base (not shown) and capable of moving in the X and Y directions in FIG. 5, and an ink-jet head IJH fixed on a base via a support member (not shown) above the X-Y table 22. A glass substrate 12 on which a light-shielding grating 10b and a layer 14 to be dyed (see FIG. 2) are formed by the above method is placed on the X-Y table 22. The ink-jet head IJH includes a red head 120a for discharging a red ink, a green head 120b for discharging a green ink, and a blue head 120c for discharging a blue ink. These heads 120a, 120b, and 120c are designed to discharge inks independently.

In the manufacturing apparatus 20 having the above arrangement, an R (red), G (green), or B (blue) ink is discharged into a desired frame of the light-shielding grating 10b while the X-Y table 22 moves with respect to the ink-jet head IJH in the X and Y directions. In this manner, each frame of the light-shielding grating 10b is colored to complete a color filter.

As will be described later, in order to repair defective portions of the color filter, a TV camera 24 detects defects such as a white omission in each filter element.

Figure 6:
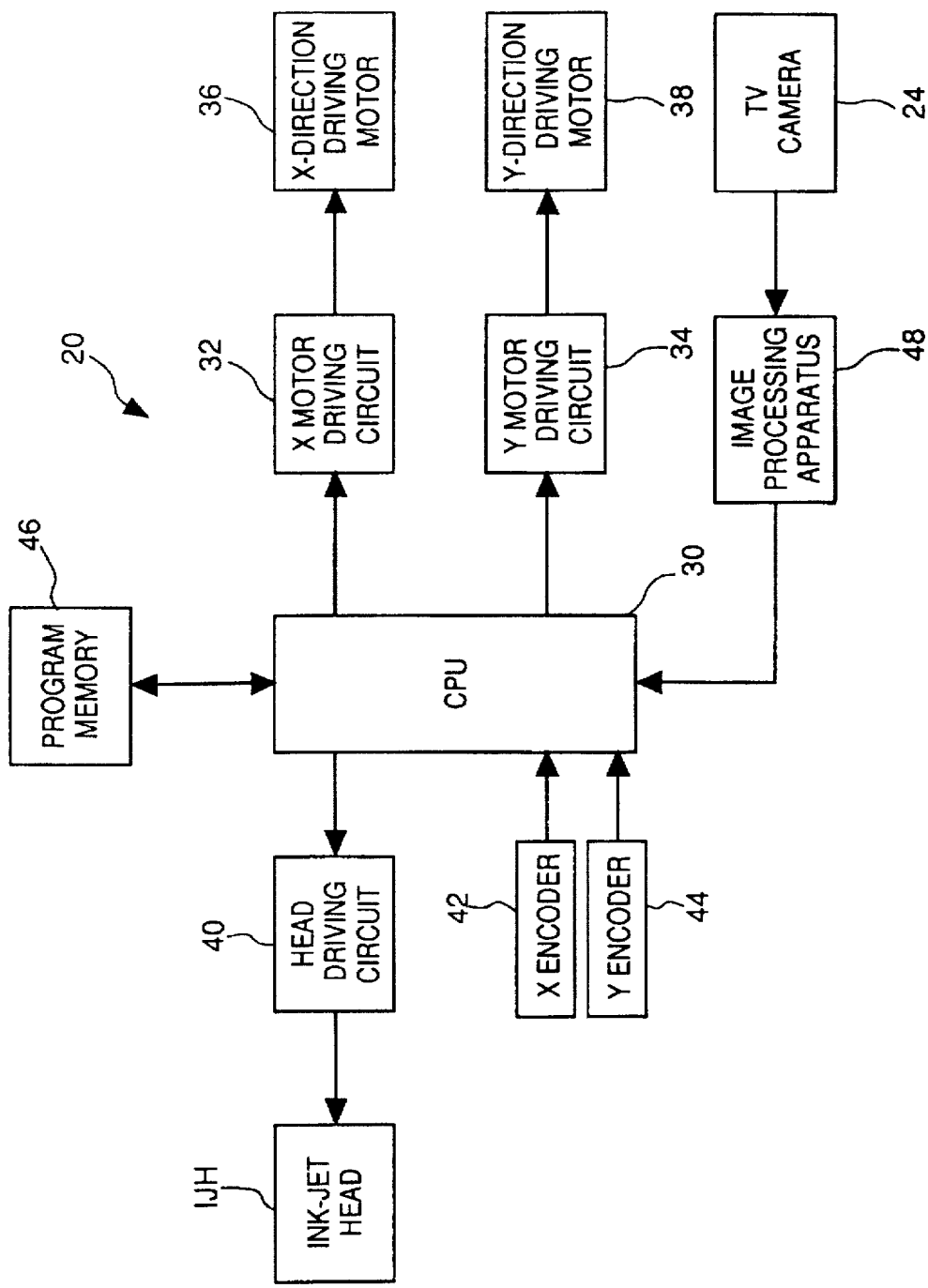
FIG. 6 is a block diagram showing the arrangement of the color filter manufacturing apparatus.

FIG. 6 is a block diagram showing the arrangement of the manufacturing apparatus 20.

Referring to FIG. 6, X- and Y-direction driving motors 36 and 38 for driving the X-Y table 22 in the X and Y directions are connected to a CPU 30 for controlling the overall operation of the manufacturing apparatus 20 via X and Y motor driving circuits 32 and 34. The ink-jet head IJH is also connected to the CPU 30 via a head driving circuit 40. Furthermore, X and Y encoders 42 and 44 for detecting the position of the X-Y table 22 is connected to the CPU 30. With this arrangement, position information on the X-Y table 22 is input to the CPU 30. In addition, a control program in a program memory 46 is input to the CPU 30. The CPU 30 moves the X-Y table 22 in accordance with this control program and position information from the X and Y encoders 42 and 44. With this operation, a desired grating frame on the glass substrate 12 is brought to a position below the ink-jet head IJH, and an ink having a desired color is discharged into the frame to color it. A color filter is manufactured by performing this operation for each frame of the light-shielding grating 10b. An image of each filter element input from the TV camera 24 is input to an image processing unit 48, and defects in filter elements are detected. At the same time, X- and Y-coordinates corresponding to the defects are stored in a memory in the CPU 30.

A method of repairing defects in the color filter 10 will be described in detail next.

Figure 7A:
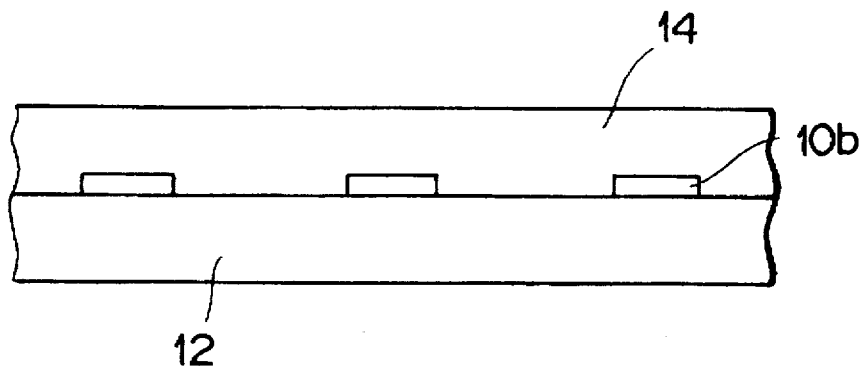
FIGS. 7A, 7B and 7C are sectional views showing a method of repairing defective portions of a color filter manufactured by an ink-jet method.
Figure 7B:
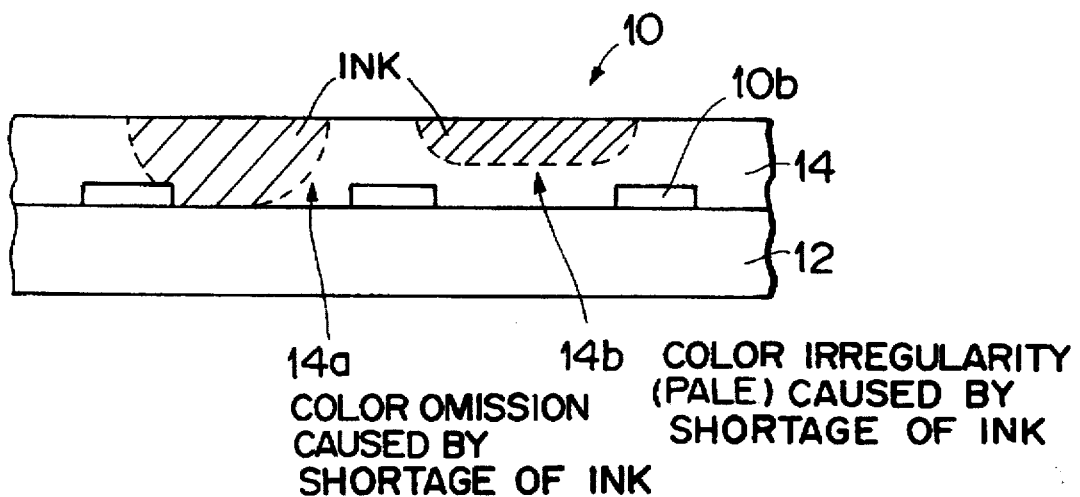
Figure 7C:
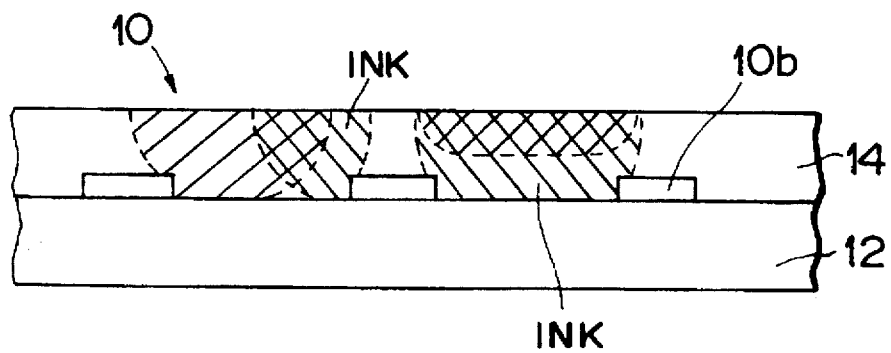

FIGS. 7A to 7C show a method of repairing defective portions of a color filter manufactured by the ink-jet method. In the ink-jet method, which has already been described above, as shown in FIG. 7B, an ink is discharged onto the glass substrate 12, on which the layer 14 is formed as shown in FIG. 7A, thereby coloring the layer 14. In this case, as indicated by reference numerals 14a and 14b, a color omission and color irregularity may occur because of a shortage of the amount of ink discharged. When such defects are caused, the defective portions are detected by the above TV camera 24, and an ink is newly discharged onto the portions by the ink-jet head IJH, as shown in FIG. 7C, thereby repairing the defective portions. In this manner, the color filter 10 having defective portions can be repaired to obtain a product without any defect.

Figure 8A:
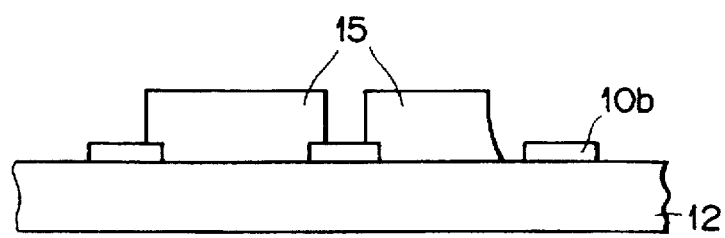
FIGS. 8A, 8B, 8C and 8D are sectional views showing a method of repairing defective portions of a color filter manufactured by the dyeing method.
Figure 8B:
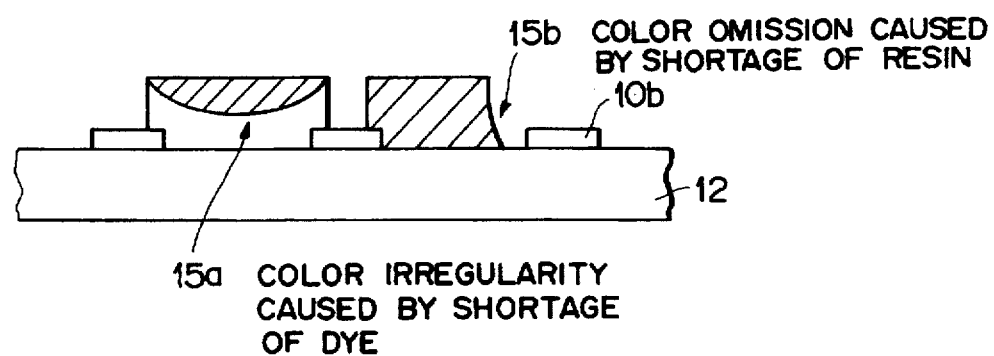
Figure 8C:
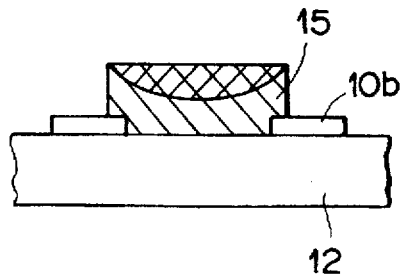
Figure 8D:
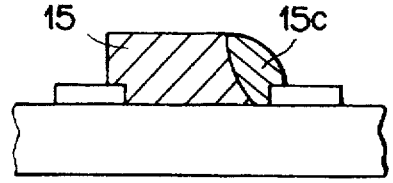

FIGS. 8A to 8D show a method of repairing defective portions of a color filter manufactured by the dyeing method. In the dyeing method, a water-soluble polymer material used for dyeing is coated on the glass substrate 12. As shown in FIG. 8A, this coating is patterned into a desired shape by a photolithography process to form filter elements 15 on the glass substrate 12. In this case, color irregularity due to insufficient dyeing and a color omission due to a resin omission may occur, as indicated by reference numerals 15a and 15b in FIG. 8B, respectively. When such a defect is caused, the glass substrate 12 is placed on the X-Y table 22 of the manufacturing apparatus shown in FIG. 5, and the glass substrate 12 is scanned in the X and Y directions with respect to the TV camera 24 to detect the defect. If the defect is caused by insufficient dyeing, an ink is discharged from the ink-jet head IJH onto the filter element 15 so as to repair the defect, as shown in FIG. 8C. If the defect is caused by a resin omission, a hardening resin 15c containing a dye or pigment is discharged from the ink-jet head IJH onto the corresponding portion to repair the defect, as shown in FIG. 8D.

Figure 9A:
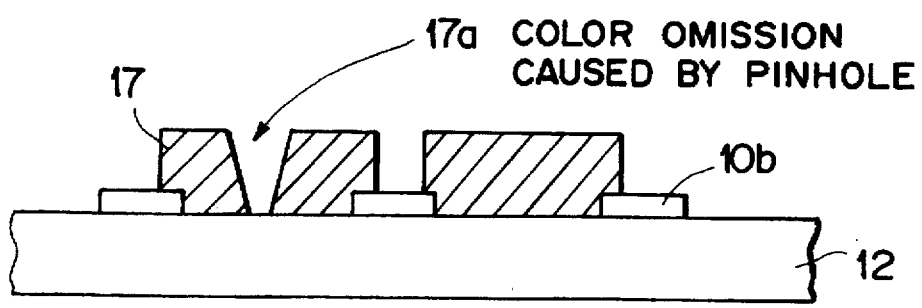
Figure 9B:
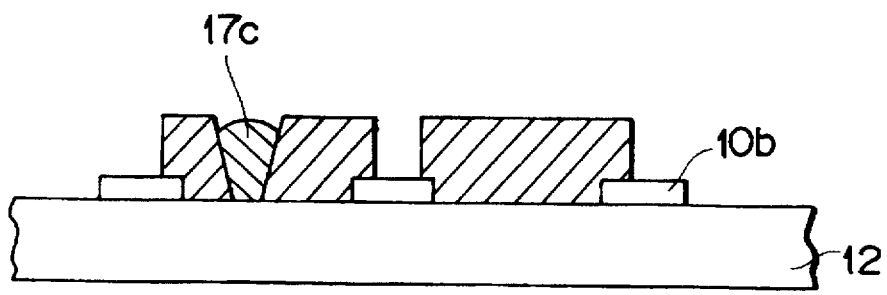

FIGS. 9A and 9B show a method of repairing a defective portion 17a as a color omission caused by a pinhole in a filter element 17 formed by the dyeing method, the pigment dispersion method, or the like. Even such a pinhole-like defective portion 17a can be repaired by discharging a hardening resin 17c containing a dye or pigment from the ink-jet head IJH onto the defective portion 17a.

Figure 10A:
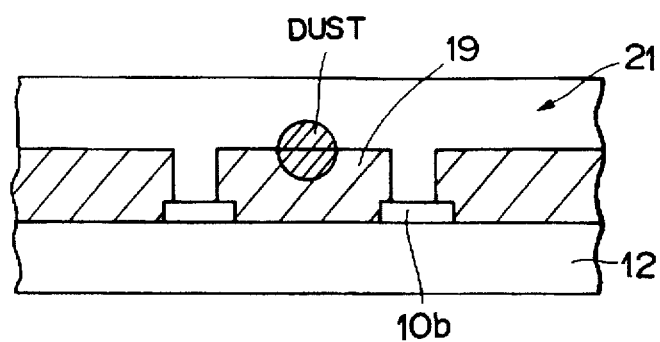
FIGS. 10A, 10B, 10C and 10D are sectional views showing a case wherein a defect is caused by dust or the like which adheres to a filter element in forming a protective layer thereon.
Figure 10B:
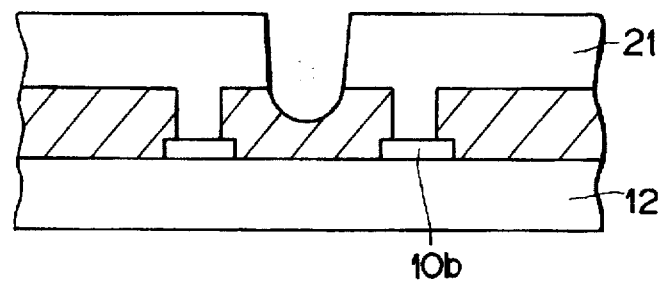
Figure 10C:
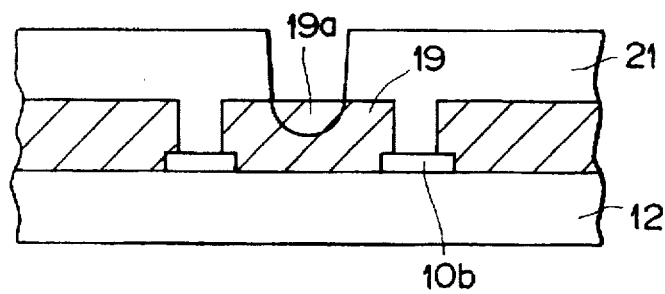
Figure 10D:
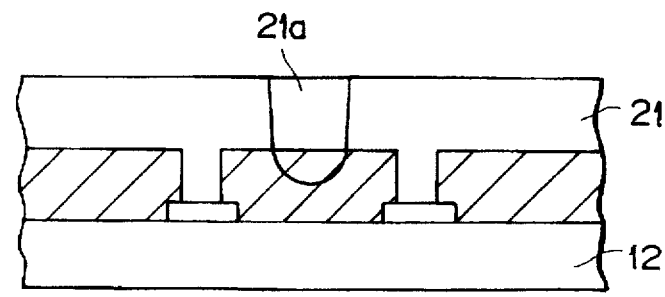

FIGS. 10A to 10D show a case wherein a defect is caused by dust or the like which adheres to a filter element 19 in forming a protective layer 21 thereon. In this case, first of all, a portion in which the dust or the like is mixed as shown in FIG. 10A is removed together with the dust by a laser removing process which removes at least a portion of the filter element having foreign substance by using laser beam, as shown in FIG. 10B. As shown in FIG. 10C, a hardening resin 19a containing a dye or pigment is then discharged from the ink-jet head IJH onto the portion from which the dust has been removed, thereby repairing the filter element 19. In addition, as shown in FIG. 10D, a hardening resin 21a consisting of the same component as that of the protective layer 21 is discharged from the ink-jet head IJH onto the hardening resin 19a, thereby completing the repair process.

The above repair process will be described below with reference to the flow chart indicated by "(a)" in FIG. 11, which schematically shows a repair method. In the flow chart indicated "(a)" in FIG. 11, a manufactured color filter is tested and repaired by using the above repair apparatus having a test function.

Figure 11:
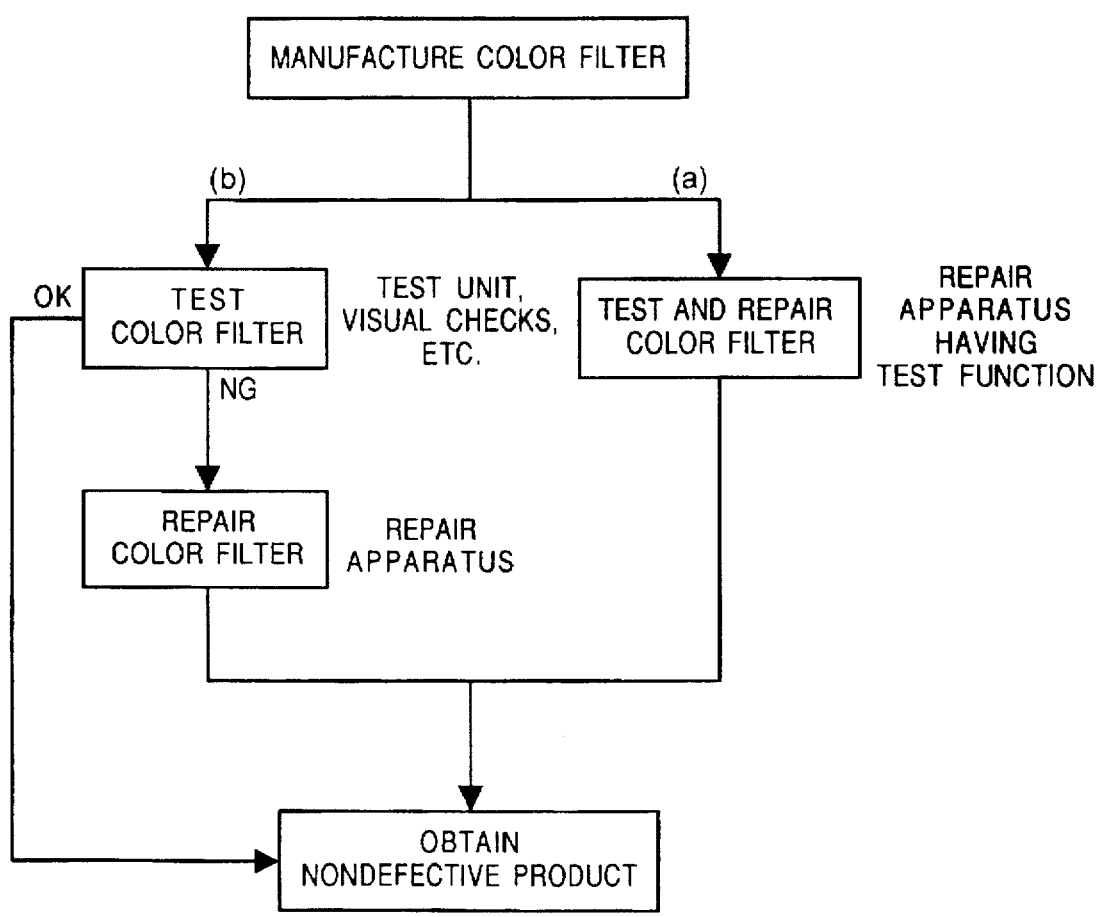
FIG. 11 is a flow chart schematically showing a color filter repair method.

Note that a repair apparatus from which the test function of the above repair apparatus is separated may be used, as indicated by "(b)" in FIG. 11. In this case, a test is automatically performed by a test unit or performed by visual checks, and only a defective product is repaired by the repair apparatus.

As described above, according to this embodiment, only filter elements having defects can be easily repaired by discharging a coloring material onto the defective portions of the color filter using the ink-jet head. Therefore, the efficiency of a repair process can be greatly improved.

In addition, since an apparatus for manufacturing color filters by the ink-jet method can be used, without any modification, as an apparatus for repairing defects of color filters, any new repair apparatus need not be prepared, resulting in a reduction in the cost of facilities.

Various changes and modifications of the above embodiments can be made without departing the scope and spirit of the invention.

For example, in the above embodiments, the ink-jet head is fixed, and the X-Y stage is moved. However, the ink-jet head may be moved while the stage is fixed.

According to the above description, the present invention is applied to the print apparatus of the system, among various ink-jet recording systems, which has a means (e.g., an electricity-to-heat converter or laser light) for generating heat energy as energy used to discharge an ink, and changes the state of an ink by using the heat energy. According to this system, a high-density, high-precision recording operation can be realized.

As for the typical structure and principle, it is preferable that the basic structure disclosed in, for example, U.S. Pat. Nos. 4,723,129 or 4,740,796 is employed. The aforesaid method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electricity-to-heat converter disposed to face a sheet or a fluid passage which holds the fluid (ink) to a level higher than levels at which film boiling takes place are applied to the electricity-to-heat converter in accordance with recording information so as to generate heat energy in the electricity-to-heat converter and to cause the heat effecting surface of the recording head to take place film boiling so that bubbles can be formed in the fluid (ink) to correspond to the one or more drive signals. The enlargement/contraction of the bubble will cause the fluid (ink) to be discharged through a discharging opening so that one or more droplets are formed. If a pulse shape drive signal is employed, the bubble can be enlarged/contracted immediately and properly, causing a further preferred effect to be obtained because the fluid (ink) can be discharged while revealing excellent responsibility.

It is preferable that a pulse drive signal disclosed in U.S. Pat. Nos. 4,463,359 or 4,345,262 is employed. If conditions disclosed in U.S. Pat. No. 4,313,124 which is an invention relating to the temperature rising ratio at the heat effecting surface are employed, a satisfactory recording result can be obtained.

As an alternative to the structure (linear fluid passage or perpendicular fluid passage) of the recording head disclosed in each of the aforesaid inventions and having an arrangement that discharge ports, fluid passages and electricity-to-heat converters are combined, a structure having an arrangement that the heat effecting surface is disposed in a bent region and disclosed in U.S. Pat. Nos. 4,558,333 or 4,459,600 may be employed. In addition, the following structures may be employed: a structure having an arrangement that a common slit is formed to serve as a discharge section of a plurality of electricity-to-heat converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

Furthermore, as a recording head of the full line type having a length corresponding to the maximum width of a recording medium which can be recorded by the recording unit, either the construction which satisfies its length by a combination of a plurality of recording heads as disclosed in the above specifications or the construction as a single full line type recording head which has integrally been formed can be used.

In addition, the invention is effective for a recording head of the freely exchangeable chip type which enables electrical connection to the recording unit main body or supply of ink from the main device by being mounted onto the apparatus main body, or for the case by use of a recording head of the cartridge type provided integrally on the recording head itself.

It is preferred to additionally employ the recording head restoring means and the auxiliary means provided as the component of the present invention because the effect of the present invention can be further stabled. Specifically, it is preferable to employ a recording head capping means, a cleaning means, a pressurizing or suction means, an electricity-to-heat converter, an another heating element or a sub-heating means constituted by combining them and a sub-emitting mode in which an emitting is performed independently from the recording emitting in order to stably perform the recording operation.

Although a fluid ink is employed in the aforesaid embodiment of the present invention, an ink which is solidified at the room temperature or lower and as well as softened at the room temperature, an ink in the form of a fluid at the room temperature, or an ink which is formed into a fluid when the recording signal is supplied may be employed because the aforesaid ink-jet method is ordinarily arranged in such a manner that the temperature of ink is controlled in a range from 30° C. or higher to 70° C. or lower so as to make the viscosity of the ink to be included in a stable discharge range.

Furthermore, an ink which is solidified when it is caused to stand, and liquified when heat energy is supplied in accordance with a recording signal can be adapted to the present invention to positively prevent a temperature rise caused by heat energy by utilizing the temperature rise as energy of state transition from the solid state to the liquid state or to prevent ink evaporation. In any case, an ink which is liquified when heat energy is supplied in accordance with a recording signal so as to be discharged in the form of fluid ink, or an ink which is liquified only after heat energy is supplied, e.g., an ink which starts to solidify when it reaches a recording medium, can be adapted to the present case, the ink the aforesaid case, the ink may be of a type which is held as fluid or solid material in a recess of a porous sheet or a through hole at a position to face the electricity-to-heat converter as disclosed in Japanese Patent Laid-Open No. 54-56847 or Japanese Patent Laid-Open No. 60-71260. It is the most preferred way for the ink to be adapted to the aforesaid film boiling method.

As has been described above, according to the present invention, a coloring material is discharged onto defective portions of a color filter by using an ink-jet head. With this operation, defects in elements of different colors of the color filter can be repaired by one process while the ink-jet head is scanned. Therefore, defects in a color filter can be easily repaired.

In addition, since a color filter manufacturing apparatus can be used to repair defects, any new repair apparatus need not be prepared, resulting in a reduction in the cost of facilities.

The present invention is not limited to the above embodiments and various changes and modifications can be made within the spirit and scope of the present invention. Therefore, to apprise the public of the scope of the present invention the following claims are made.

What is claimed is:

1. A color filter manufacturing method of manufacturing a color filter formed by arranging filter elements colored in respective colors on a transparent substrate in the form of a predetermined pattern, said method including repairing a defective portion of one of the filter elements and comprising:

a first step of detecting a position of the defective portion;

a second step of moving relative positions of an ink-jet head capable of discharging coloring materials of different colors and the color filter by using moving means so that a position of the ink-jet head coincides with the detected position of the defective portion; and a third step of discharging coloring material by a discharge operation from the ink-jet head onto only the defective portion so as to cover the defective portion by the discharge operation.

2. The method according to claim 1, further comprising an initial step of coloring a dyeable resin layer formed on the substrate, wherein the coloring material discharged from the ink-jet head is a fluid containing a dye or pigment.

3. The method according to claim 1, further comprising an initial step of forming and patterning a resin composition containing a coloring material on the substrate, wherein the coloring material discharged from the ink-jet head is a pigment-dispersed hardening resin.

4. The method according to claim 1, wherein the ink-jet head is a recording head for discharging the coloring material by using heat energy, the recording head comprising a heat energy converter for generating heat energy supplied to the coloring material.

\* \* \* \* \*

UNITED STATES PATENT AND TRADEMARK OFFICE
CERTIFICATE OF CORRECTION

PATENT NO. : 5,714,195
DATED : February 3, 1998
INVENTOR(S) : SHOJI SHIBA, ET AL.

It is certified that error appears in the above-identified patent and that said Letters Patent is hereby corrected as shown below:

TITLE PAGE:
AT [56] REFERENCES CITED/FOREIGN PATENT DOCUMENTS

"3274504" should read --3-274504--; and

"5288917" should read --5-288917--
       5288918             5-288918
       5303014             5-303014

COLUMN 1

Line 13, "apparats," should read --apparatus--.

COLUMN 2

Line 10, "portion," should read --portion--.

COLUMN 8

Line 36, "an" should be deleted;
    Line 44, "An ink" should read --Ink--; and
    Line 54, "an" should be deleted.

Signed and Sealed this

Twenty-fourth Day of November, 1998

Attest:

BRUCE LEHMAN

Attesting Officer    Commissioner of Patents and Trademarks